United States Patent [19]

Hitchcock

[11] Patent Number: 5,485,681
[45] Date of Patent: Jan. 23, 1996

[54] SWIVEL TYPE DIPSTIK

[75] Inventor: Robert S. Hitchcock, Lake Providence, La.

[73] Assignee: Moeller Products, Inc., Greenville, Mich.

[21] Appl. No.: 266,668

[22] Filed: Jun. 28, 1994

[51] Int. Cl.[6] ............................................. G01F 23/04
[52] U.S. Cl. .................................................. 33/722; 33/731
[58] Field of Search ........................... 33/722, 726, 728, 33/731, 730, 729; 220/86.2; 73/290 B; 116/227

[56] References Cited

U.S. PATENT DOCUMENTS

| | | |
|---|---|---|
| 3,371,418 | 3/1968 | Moeller .................................... 33/729 |
| 3,703,038 | 11/1972 | Smith . |
| 4,113,138 | 9/1978 | Fields et al. . |
| 4,331,185 | 5/1982 | Rinaldo et al. ......................... 33/722 |
| 4,531,293 | 6/1985 | Grinde .................................... 33/729 |
| 4,965,942 | 10/1990 | Hoszowski ............................. 33/731 |
| 4,991,436 | 2/1991 | Roling .................................... 73/320 |
| 5,022,495 | 6/1991 | Lavender . |
| 5,086,943 | 2/1992 | Poskie . |

*Primary Examiner*—Christopher W. Fulton
*Attorney, Agent, or Firm*—Dickinson, Wright, Moon, Van Dusen & Freeman

[57] ABSTRACT

A swivel type dipstick with a screw-on cap is provided. The swivel allows the blade of the dipstick to rotate freely, thus allowing the dipstick to be used with nonlinear fill tubes. The screw-on cap provides a tight seal between the dipstick and the fill tube, thereby preventing fluid leakage.

5 Claims, 2 Drawing Sheets

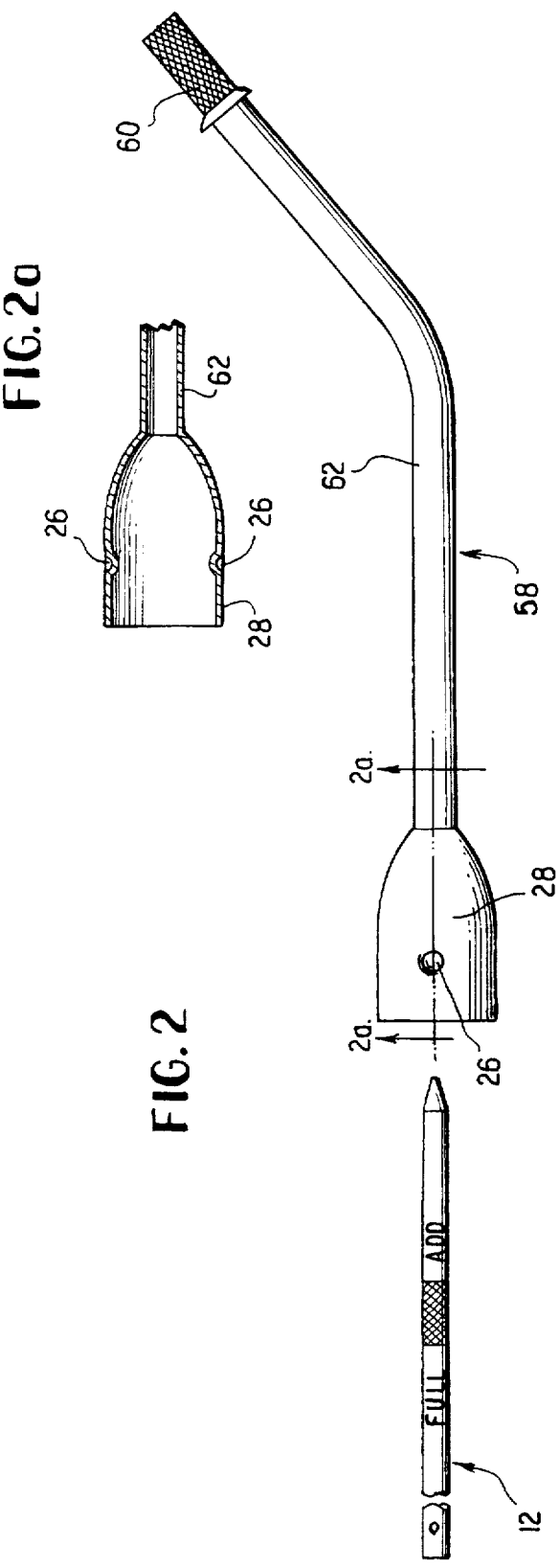
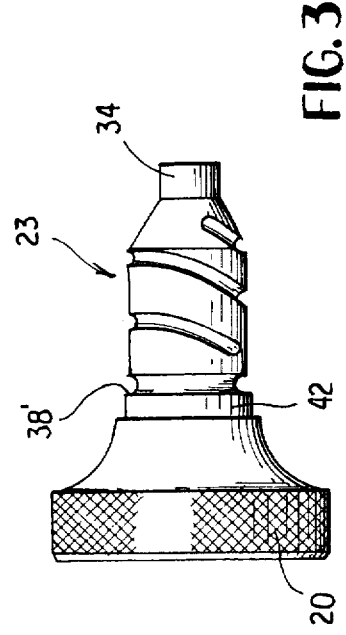
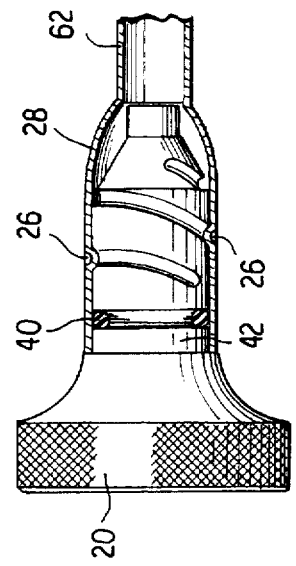

5,485,681

SWIVEL TYPE DIPSTIK

FIELD OF THE INVENTION

This invention relates to a swivel type dipstick with a threaded connection that is suitable for use with non-linear fill tubes.

BACKGROUND OF THE INVENTION

Several types of dipsticks are known to the art. All of these dipsticks provide a manual means for monitoring fluid levels in engines. However, the means by which the dipstick cap is secured to the fill tube, and the design of the dipstick blade, vary considerably. For example, U.S. Pat. No. 3,703,038 (Smith) discloses an oil dipstick with a wiper housing. The rod rotates within the wiper housing so that the fluid residue will not be accidentally wiped from the fluid level indicia on the rod when the rod is removed from the fill tube. U.S. Pat. No. 5,022,495 (Lavender) discloses a dipstick with an s-shaped blade. The cap of the dipstick is equipped with flanges so that it locks into place when it is turned. U.S. Pat. No. 5,086,943 (Poskie) discloses a dipstick useful for monitoring the level of transmission fluid. The dipstick has a screw-on cap which is fitted with an o-ring to perfect the seal of the cap. The blade of the dipstick is molded to the cap and has a series of horizontal and vertical indicia.

In many engines, the seal integrity between the dipstick cap and the fill tube is important to prevent fluid leakage. In these applications, screw-on caps are usually employed to effect a tight seal. However, many of the more complex modern engines are crowded in the vicinity of the fluid reservoir, and therefore require nonlinear fill tubes. To date, it has not been possible to use conventional dipstick designs and screw-on caps with nonlinear fill tubes, since the blade of the dipstick, when bent, is pressed against the side of the fill tube as the cap is turned, thereby arresting its movement. This problem was recognized, for example, in U.S. Pat. No. 5,022,495 (Lavender), Col. 1, Lines 20–23.

It is thus an object of the present invention to provide an inexpensive, easy to use, improved dipstick with a screw-on cap that is capable of being used with nonlinear fill tubes.

SUMMARY OF THE INVENTION

The present invention is a swivel type dipstick with a screw-on cap. The swivel allows the blade of the dipstick to rotate freely, thus allowing the dipstick to be used with nonlinear fill tubes. The screw-on cap provides a tight seal between the dipstick and the fill tube, thereby preventing fluid leakage.

BRIEF DESCRIPTION OF THE DRAWINGS

FIG. 2 is a side view of a nonlinear fill tube compatible with the dipstick of the present invention;

FIG. 2a is a side view in section taken along the line 2a—2a of FIG. 2;

FIG. 3 is a side view of the preferred embodiment of the cap of the present invention; and FIG. 4 is a side view, partially in section, of the cap of FIG. 3, shown engaged in a fill tube.

PREFERRED EMBODIMENTS OF THE INVENTION

Figure 1:
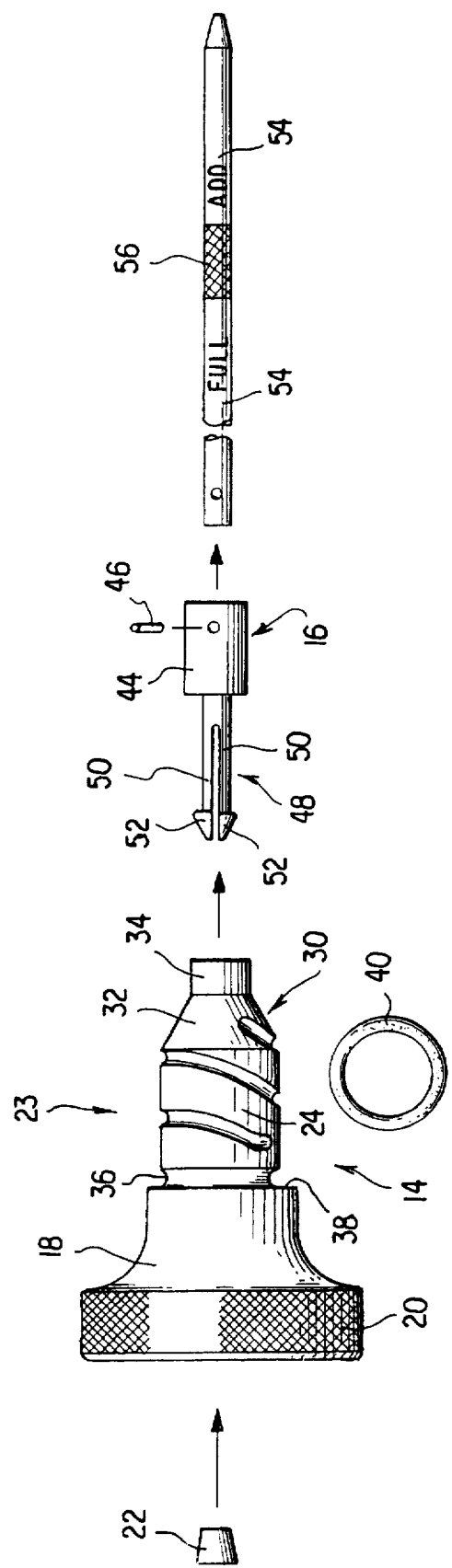
FIG. 1 is a side exploded view of the cap and blade of the dipstick of the present invention.

The present invention is a swivel type dipstick which is compatible with both linear and nonlinear fill tubes. FIG. 1 shows the various components of the dipstick 10. The dipstick has a blade 12 which depends from a screw-on cap 14. A swivel 16 is interposed between the blade and the cap and allows the blade to rotate freely about its longitudinal axis.

The cap of the present invention has a broad knob 18 which is fitted with a handgrip 20 that facilitates twisting of the cap. The handgrip may consist of cross-hatched plastic, neoprene rubber, or any other material that provides suitable friction to the user's hand. The knob may also be fitted with a plug 22 or other pressure release means that prevents forceful ejection of the cap due to pressure build-up.

The knob tapers into a threaded male receptacle 23. The threads 24 of the male receptacle are properly sized so that, as shown in FIG. 4, they rotatingly engage the dimples 26 on the interior surface of the female receptacle 28 of the fill tube. The threads on the male receptacle are designed so that their leading edge will engage the dimples of the female receptacle after a rotation of 180° or less.

Referring again to FIG. 1, the male receptacle terminates in a hollow conical segment 30 which has a tapered body 32 and a cylindrical tip 34. The cylindrical tip has a smaller diameter than the interior diameter of the female receptacle of the fill tube, thereby facilitating the insertion of the male receptacle into the female receptacle.

The male receptacle is separated from the knob by a first annular indentation 36. In one embodiment, the first annular indentation is situated with respect to the threads so that its upper shoulder 38 is flush against the edge of the female receptacle when the cap is completely screwed onto the fill tube. This feature causes the dipstick to penetrate the fill tube to the same depth each time the cap is screwed on, thereby ensuring the accuracy and consistency of the readings. The first annular indentation is fitted with an o-ring 40 or other suitable sealing means for effecting a seal between the cap and the fill tube.

In a second, more preferred embodiment of the cap shown in FIG. 3, the knob is provided with a second annular indentation 42 immediately adjacent to the first annular indentation. The diameter of the second annular indentation is slightly larger than the diameter of the first annular indentation, thereby creating an upper shoulder 38' which serves to secure the o-ring in place. However, the diameter of the second annular indentation is slightly less than the interior diameter of the fill tube, and has an upper shoulder 43 with a diameter that is slightly larger than the interior diameter of the fill tube. As shown in FIG. 4, this construction allows the o-ring to extend further into the fill tube when the cap is screwed on as compared to the first embodiment, thereby providing a more secure seal.

Many o-rings are known to the art which are suitable for use with the present invention. In any particular instance, the composition of the o-ring is dictated by the particular application for which the dipstick is designed. Thus, for example, neoprene o-rings may be suitable when the dipstick is used for oil, while a more chemically resistant o-ring made from plastic coated with teflon® or another polyfluoroethylene may be desirable for use with more corrosive liquids.

Many types of swivels, such as ball bearing type swivels, are known and are suitable for use as the swivel of the present invention. However, the preferred swivel of the present invention is shown in FIG. 1. This swivel has a hollow cylinder 44 which houses the upper end of the dipstick blade. The blade is preferably secured to the swivel by a dowel 46 or other suitable blade retention means. The cylinder terminates on one end in a fork 48 having at least two tines 50. Each of the tines terminates in a triangular grip 52. The tines are made out of a material, such as plastic, that is suitably resilient so that the tines may be bent inwardly. In their normal position, the distance between the furthermost tips of the triangular grips is larger than the interior diameter of the conical segment. However, when the tines are bent inwardly, the distance between the furthermost tips of the triangular grips is smaller than the interior diameter of the conical segment, thus allowing the tines to be inserted into the conical segment. When the tines are released, they expand outwardly to their normal position and engage the interior surface of the conical segment, thus securing the dipstick blade to the cap. However, since the tines only slidingly engage the interior surface of the conical segment, the dipstick blade rotates freely around its longitudinal axis.

The blade of the dipstick is made from a material that is flexible and is chemically resistant to the particular fluid in the fill tube. Thus, for example, when the dipstick is used as an oil dipstick, the blade is preferably made out of cold rolled steel. When the dipstick is used to monitor antifreeze levels, on the other hand, the blade may be constructed out of high density polyethylene or some other material resistant to ethylene glycol and other common antifreeze solutions. The blade is provided with indicia 54 which indicate the fluid level in the fill tube. Preferably, the blade is also provided with a cross-hatched portion 56 or some other suitable fluid retaining means for retaining fluid in the vicinity of the indicia so that the fluid level can be ascertained.

FIG. 2 shows a typical nonlinear fill tube 58 with which the dipstick of the present invention is compatible. The fill tube terminates on one end in a female receptacle 28 and on the other end in a fluid filter 60. As shown in FIG. 2a, the interior of the female receptacle is equipped with a plurality of dimples which are appropriately sized to engage the threads of the male receptacle.

As illustrated in FIG. 2, the body 62 of the fill tube is bent at an angle. When the blade of the dipstick is inserted into the fill tube, it bends to assume the shape of the fill tube. The fill tube is in open communication with a fluid reservoir, thereby allowing for direct measurement of fluid levels.

The following example illustrates the use of the dip stick of the present invention with a non-linear fill tube.

EXAMPLE: The blade of the dipstick is wiped clean and is inserted into the nonlinear fill tube. The cap of the dipstick is then turned clockwise as far as it will go, causing the blade to come into contact with the fluid inside of the fill tube. As the cap is twisted, the blade presses against the side of the fill tube, creating torsional pressure around the longitudinal axis of the blade. The blade responds by swiveling around this axis.

The cap is then unscrewed in a counterclockwise direction and the blade is retracted from the fill tube. The fluid level is determined by the uppermost level of fluid residue left on the indicia. The blade is then wiped clean and returned to the fill tube.

The above description is intended to convey an understanding of the present invention. Modifications within the scope of the invention will be obvious to those skilled in the art. Therefore, the scope of the invention should be determined solely by reference to the appended claims.

We claim:

1. A dipstick for use with a fill tube, said dipstick comprising:

a screw-on cap;

a blade dependent from said cap;

swivel means interposed between said blade and said cap for allowing said blade to rotate freely about its longitudinal access, said swivel means further comprising engaging means for slidingly engaging a surface; and receiving means for receiving said engaging means and wherein said receiving means comprises a segment of said cap having a conical interior.

2. A dipstick for use with a fill tube, said dipstick comprising:

a screw-on cap;

a blade dependent from said cap;

swivel means interposed between said blade and said cap for allowing said blade to rotate freely about its longitudinal access, said swivel means further comprising engaging means for slidingly engaging a surface; and receiving means for receiving said engaging means, and wherein said engaging means comprises a fork with a plurality of resilient tines that are inserted into said receiving means.

3. The dipstick of claim 2, wherein each of said tines terminates in a triangular segment whose base is wider than the width of the adjoining portion of the tine.

4. The dipstick of claim 3, wherein the distance between at least one point located on one of said triangular segments and a second point located on a another of said triangular segments is greater than theinterior diameter of said receiving means.

5. A dipstick assembly, comprising:

a nonlinear fill tube having a narrow, elongated body; and a dipstick compatible with said fill tube, said dipstick comprising:

a screw-on cap having a rounded handgrip and a protruding male element;

a substantially flat, flexible blade depending from said cap; and swivel means, interposed between said blade and said cap, for allowing said blade to rotate freely about its longitudinal axis, said swivel means comprising a plurality of tines and a receptacle with a conical interior surface for slidably receiving said tines.

* * * * *

UNITED STATES PATENT AND TRADEMARK OFFICE
CERTIFICATE OF CORRECTION

PATENT NO. : 5,485,681
DATED : January 23, 1996
INVENTOR(S) : Hitchcock et al.

It is certified that error appears in the above-identified patent and that said Letters Patent is hereby corrected as shown below:

On the cover page, Assignee Section which reads:
    "Moeller Products, Inc. Greenville, Mich"

Should be corrected to read:

-- Moeller Products, Inc. Greenville, Miss. --

Signed and Sealed this

Seventh Day of May, 1996

*Attest:*

BRUCE LEHMAN

*Attesting Officer*      Commissioner of Patents and Trademarks